United States Patent
Cha et al.

(10) Patent No.: US 11,218,207 B2
(45) Date of Patent: Jan. 4, 2022

(54) METHOD FOR TRANSMITTING OR RECEIVING REFERENCE SIGNAL IN WIRELESS COMMUNICATION SYSTEM AND APPARATUS THEREFOR

(71) Applicant: LG ELECTRONICS INC., Seoul (KR)

(72) Inventors: Hyunsu Cha, Seoul (KR); Kijun Kim, Seoul (KR); Jonghyun Park, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 35 days.

(21) Appl. No.: 16/623,384

(22) PCT Filed: Jun. 15, 2018

(86) PCT No.: PCT/KR2018/006789
§ 371 (c)(1),
(2) Date: Dec. 16, 2019

(87) PCT Pub. No.: WO2018/231009
PCT Pub. Date: Dec. 20, 2018

(65) Prior Publication Data
US 2020/0177256 A1    Jun. 4, 2020

Related U.S. Application Data

(60) Provisional application No. 62/520,531, filed on Jun. 15, 2017.

(51) Int. Cl.
*H04B 7/06* (2006.01)
*H04L 5/00* (2006.01)
*H04W 16/28* (2009.01)

(52) U.S. Cl.
CPC ......... *H04B 7/0626* (2013.01); *H04L 5/0007* (2013.01); *H04L 5/0051* (2013.01); *H04L 5/0082* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 9,544,082 B2 | 1/2017 | Malladi et al. | |
| 2017/0126439 A1* | 5/2017 | Yoshimoto | H04B 7/0639 |

(Continued)

FOREIGN PATENT DOCUMENTS

| | | |
|---|---|---|
| KR | 20130050273 | 5/2013 |
| WO | 2017039399 | 3/2017 |

OTHER PUBLICATIONS

PCT International Application No. PCT/KR2018/006789, International Search Report dated Oct. 4, 2018, 4 pages.

(Continued)

*Primary Examiner* — Adnan Baig
(74) *Attorney, Agent, or Firm* — Lee Hong Degerman Kang Waimey

(57) ABSTRACT

The present invention relates to a method and an apparatus for receiving a reference signal by a terminal in a wireless communication system. According to the present invention, from a base station, a terminal receives configuration information of a channel state information (CSI)-RS resource for transmission of a CSI-RS, and receives the CSI-RS on the basis of the configuration information. Further, provided may be a method and an apparatus, in which a terminal configures a beam on the basis of the CSI-RS, wherein the configuration information includes at least one of a first indicator indicating the number of times the CSI-RS is repeatedly transmitted, a first offset value of a first subcarrier to which the CSI-RS resource is mapped, and information (Continued)

indicating the maximum number of times the terminal can perform beam sweeping, and the CSI-RS resource is mapped to subcarriers at a predetermined interval on a frequency axis, and the CSI-RS can be repeatedly transmitted within a specific time interval according to the first indicator.

12 Claims, 20 Drawing Sheets

(56) References Cited

U.S. PATENT DOCUMENTS

| | | | |
|---|---|---|---|
| 2019/0090218 A1* | 3/2019 | Noh | H04W 72/14 |
| 2020/0052848 A1* | 2/2020 | Gao | H04W 72/046 |

OTHER PUBLICATIONS

Intel Corporation, "On CSI-RS for Beam Management," 3GPP TSG-RAN WG1 #89, R1-1707362, May 2017, 6 pages.

Samsung, "CSI-RS for Beam Management," 3GPP TSG-RAN WG1 #89, R1-1707971, May 2017, 7 pages.

\* cited by examiner (a)

(b)

(a)    (b)

METHOD FOR TRANSMITTING OR RECEIVING REFERENCE SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/006789, filed on Jun. 15, 2018, which claims the benefit of U.S. Provisional Application No. 62/520,531, filed on Jun. 15, 2017, the contents of which are all hereby incorporated by reference herein in their entireties.

TECHNICAL FIELD

The present disclosure relates to a wireless communication system, and more particularly, to method for configuring resource for a reference signal for beam management and transmitting the reference signal in a wireless communication system and an apparatus therefor.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched,

DISCLOSURE

Technical Problem

An embodiment of the present disclosure provides a method and apparatus for configuring a channel status information (CSI)-reference signal (RS) resource for transmitting and receiving a CSI-RS in a wireless communication system.

Furthermore, an embodiment of the present disclosure provides a method and apparatus for configuring a CSR-RS resource for transmitting and receiving CSI-RS resource through interleaved frequency division multiple access (IF-DMA) in a wireless communication system.

Furthermore, an embodiment of the present disclosure provides a method and apparatus for designing a CSI-RS aiming at beam management and/or operation in a wireless communication system.

Furthermore, an embodiment of the present disclosure provides a method and apparatus for providing a transmission scheme of a CSI-RS aiming at beam management and/or operation and configuration information of a CSI-RS resource to a user equipment (UE) by a base station (BS).

The objects to be achieved in the present disclosure are not limited to the objects mentioned above, and other objects not mentioned above are apparent to those skilled in the art to which the present disclosure pertains, from the following description.

Technical Solution

Furthermore, in the present disclosure, a method of receiving a reference signal by a user equipment (UE) in a wireless communication system includes: receiving configuration information of a channel state information (CSI)-reference signal (RS) resource in which a CSI-RS is transmitted from a base station (BS); receiving the CSI-RS based on the configuration information; and configuring a beam based on the CSI-RS, wherein the configuration information includes at least one of a first indicator indicating a number of times the CSI-RS is repeatedly transmitted, a first offset value of a first subcarrier to which the CSI-RS resource is mapped, or number information indicating a maximum number of times the UE performs beam sweeping, the CSI-RS resource is mapped to a subcarrier at a regular interval on a frequency axis, and the CSI-RS is repeatedly transmitted within a specific time interval according to the first indicator.

Furthermore, in the present disclosure, the configuration information may further include a second indicator indicating a location of a subcarrier to which a non-zero power (NZP) CSI-RS resource is mapped and a third indicator indicating a location of a subcarrier to which a zero power (ZP) CSI-RS resource is mapped.

Furthermore, in the present disclosure, CSI-RS resources of other UEs may be mapped to subcarriers after the last subcarrier to which the ZP CSI-RS resource is mapped at the same interval as the interval of the CSI-RS resources of the UE.

Furthermore, in the present disclosure, when the UE supports an interference cancellation function, the configuration information may further include CSI-RS resource configuration information of another UE.

Furthermore, in the present disclosure, the configuration information may further include a second indicator indicating the number of times of repeated transmission of a CRS-RS configured to be specific for a cell or a group.

Furthermore, in the present disclosure, a null signal may be transmitted on the last subcarrier to which the CSI-RS resource is mapped.

Furthermore, in the present disclosure, a null signal may be transmitted on at least one of the first subcarrier and the last subcarrier among a plurality of subcarriers to which the CSI-RS resources are mapped.

Furthermore, in the present disclosure, the configuration information may further include a parameter value indicating a ratio of the subcarrier to the plurality of subcarriers.

Furthermore, in the present disclosure, the specific time interval may be one orthogonal frequency division multiple (OFDM) symbol interval.

Furthermore, in the present disclosure, the repeatedly transmitted CSI-RS may be received through different reception beam candidates.

Furthermore, in the present disclosure, the configuring of a beam may include selecting a specific beam based on a reception result of the CSI-RSs through the reception beam candidates.

Further, in the present disclosure, different CSI-RS antenna ports in the CSI-RS resources may be multiplexed through a code division multiplexing (CDM) technique.

Furthermore, in present disclosure, a user equipment (UE) of receiving a reference signal in a wireless communication system includes: a radio frequency (RF) module configured to transmit and receive a radio signal; and a processor configured to control the RF module, wherein the processor is configured to control the RF module to receive configuration information of a channel state information (CSI)-reference signal (RS) resource in which a CSI-RS is transmitted from a base station (BS), control the RF module to receive the CSI-RS based on the configuration information, and control the RF module to configure a beam based on the CSI-RS, wherein the configuration information includes at least one of a first indicator indicating a number of times the CSI-RS is repeatedly transmitted, a first offset value of a first subcarrier to which the CSI-RS resource is mapped, or number information indicating a maximum number of times the UE performs beam sweeping, the CSI-RS resource is mapped to a subcarrier at a regular interval on a frequency axis, and the CSI-RS is repeatedly transmitted within a specific time interval according to the first indicator.

Advantageous Effects

According to an embodiment of the present disclosure, beam management and/or operation is performed using a CSI-RS, thereby effectively using the CSI-RS.

Furthermore, according to an embodiment of the present disclosure, in the case of transmitting the CSI-RS through the IFDMA, the base station informs the UE of the method for configuring and/or transmitting the CSI-RS resources, and thus, the UE may clearly recognize transmission of the CSR-RS.

Furthermore, according to an embodiment of the present disclosure, the beam management and/or operation is performed through the CSI-RS repeatedly transmitted through IFDMA, thereby reducing delay/overhead of the beam management and/or operation procedure through the CSI-RS.

According to an embodiment of the present disclosure, in the transmission of CSI-RS through IFDMA, power of a resource to which a ZP CSI-RS resource is mapped is additionally used in a resource to which a NZP CSI-RS resource is mapped, whereby the base station may efficiently transmit the CSR-RS to the UE.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

MODE FOR INVENTION

Figure 1:
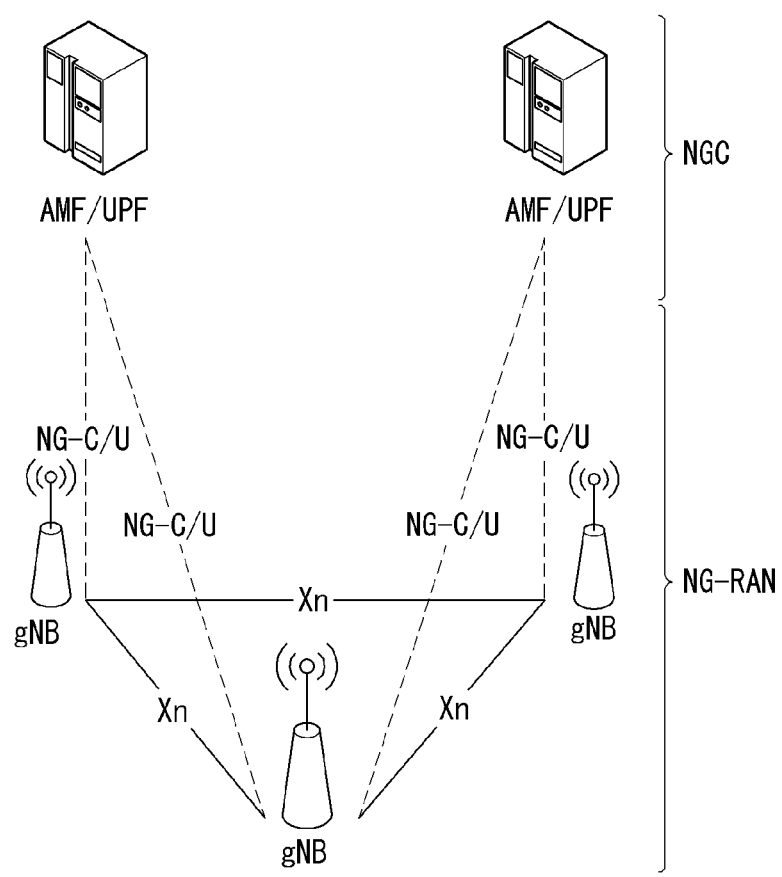
FIG. 1 is a diagram illustrating an example of an overall system structure of NR to which a method proposed in the present disclosure may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical spirit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | Δf = $2^μ \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
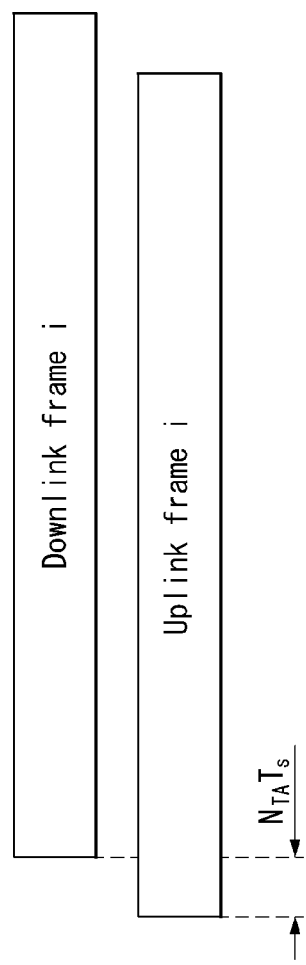
FIG. 2 illustrates a relationship between an uplink frame and a downlink frame in a wireless communication system to which the method proposed in the present disclosure may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^μ \in \{0, \ldots, N_{subframe}^{slots,\, μ}-1\}$ in a subframe, and in ascending order of $n_{s,f}^μ \in \{0, \ldots, N_{frame}^{slots,μ}-1\}$ in a radio frame. One slot is composed of continuous OFDM symbols of $N_{symb}^μ$, and $N_{symb}^μ$ is determined depending on a numerology in use and slot configuration. The start of slots $n_s^μ$ in a subframe is temporally aligned with the start of OFDM symbols $n_s^μ N_{symb}^μ$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^μ$ | $N_{frame}^{slots,\,μ}$ | $N_{subframe}^{slots,\,μ}$ | $N_{symb}^μ$ | $N_{frame}^{slots,\,μ}$ | $N_{subframe}^{slots,\,μ}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^μ$ | $N_{frame}^{slots,\,μ}$ | $N_{subframe}^{slots,\,μ}$ | $N_{symb}^μ$ | $N_{frame}^{slots,\,μ}$ | $N_{subframe}^{slots,\,μ}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
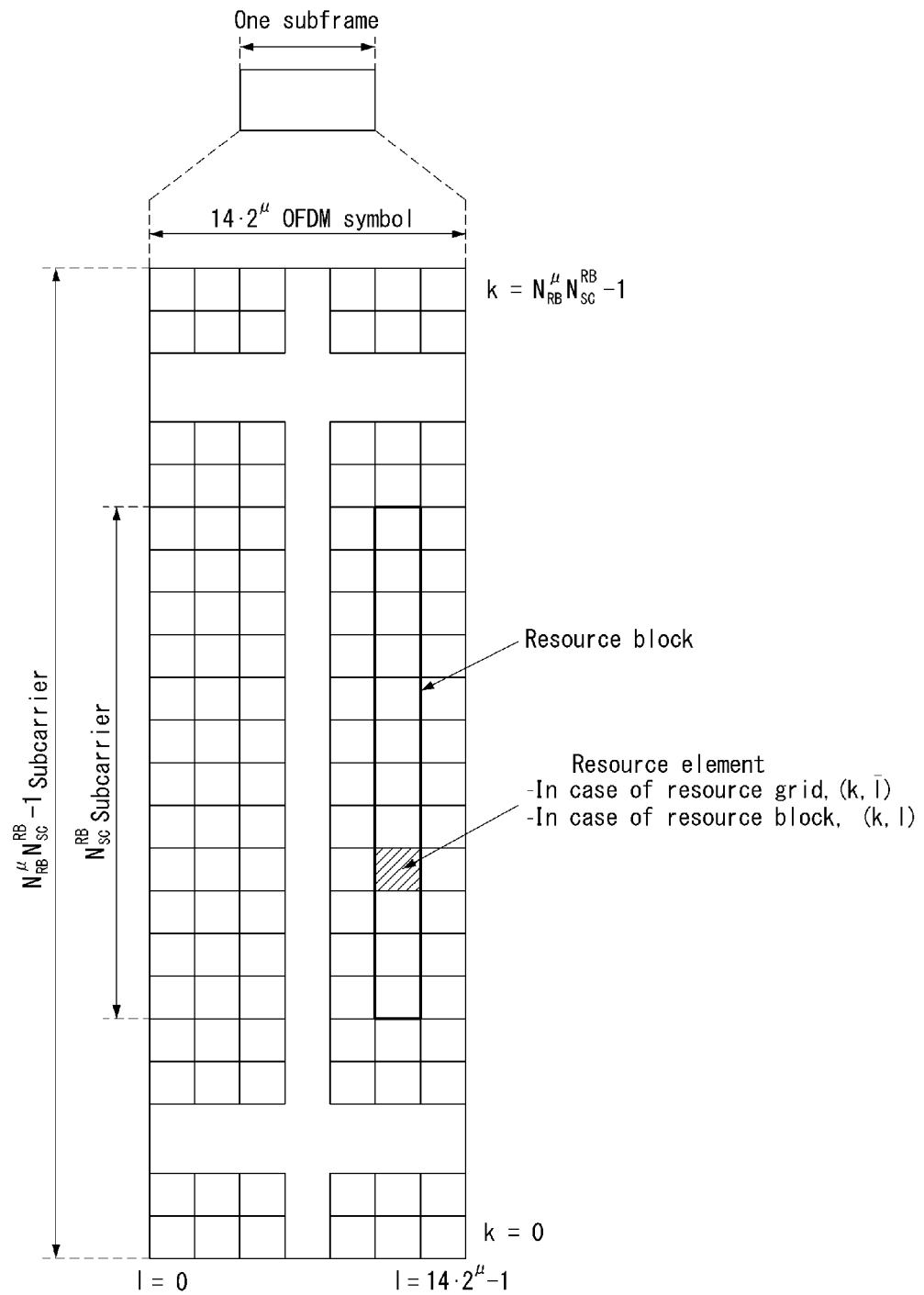
FIG. 3 illustrates an example of a resource grid supported in the wireless communication system to which the method proposed in the present disclosure may be applied.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of $14 \cdot 2^{\mu}$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l̄) Herein, k=0, . . . , $N_{RB}^{\mu} N_{sc}^{RB}-1$ is an index in the frequency domain, and l̄=0, . . . , $2^{\mu} N_{symb}^{(\mu)}-1$ indicates a location of a symbol in a subframe. To indicate a resource element in a slot, the index pair (k,l̄) is used. Herein, l=0, . . . , $N_{symb}^{\mu}-1$.

The resource element (k,l̄) for the numerology $\mu$ and the antenna port p corresponds to a complex value $a_{k,l̄}^{(p,\mu)}$. When there is no risk of confusion or when a specific antenna port or numerology is specified, the indexes p and $\mu$ may be dropped and thereby the complex value may become $a_{k,l̄}^{(p)}$ or $a_{k,l̄}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \lfloor \overline{N_{sc}^{RB}} \rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 4:
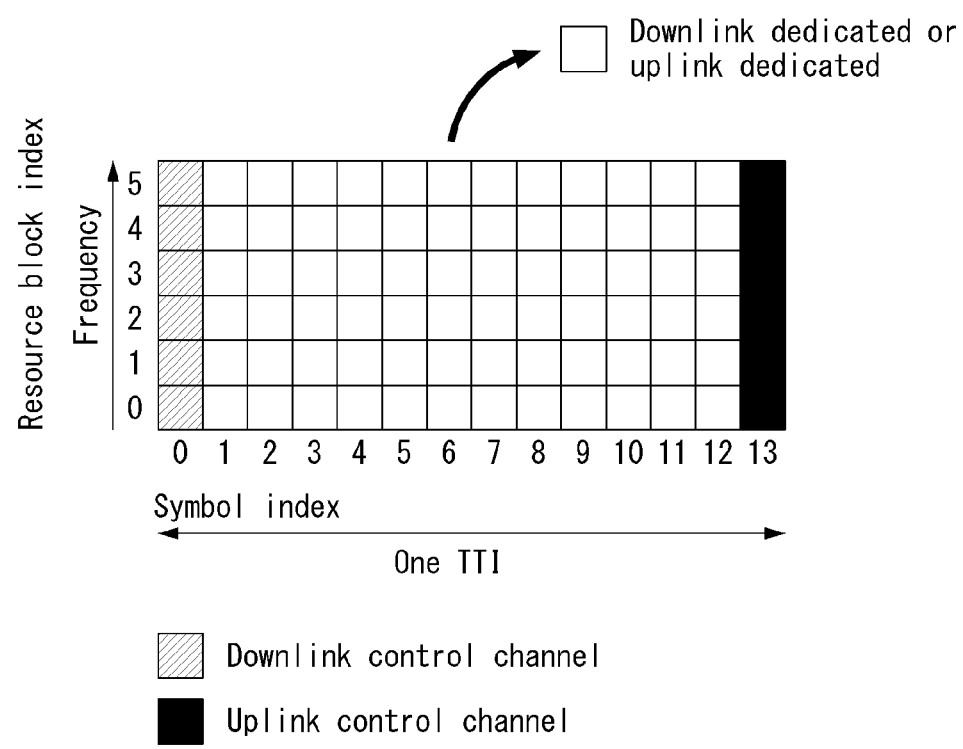
FIG. 4 is a diagram illustrating a self-contained subframe structure in the wireless communication system to which the method proposed in the present disclosure may be applied.

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK./NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

Figure 5:
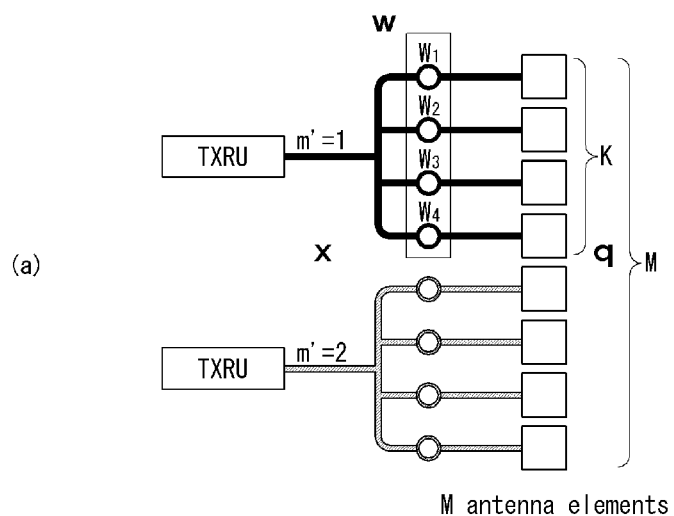
FIG. 5 illustrates a transceiver unit model in the wireless communication system to which the method proposed in the present disclosure may be applied.
Figure 5:
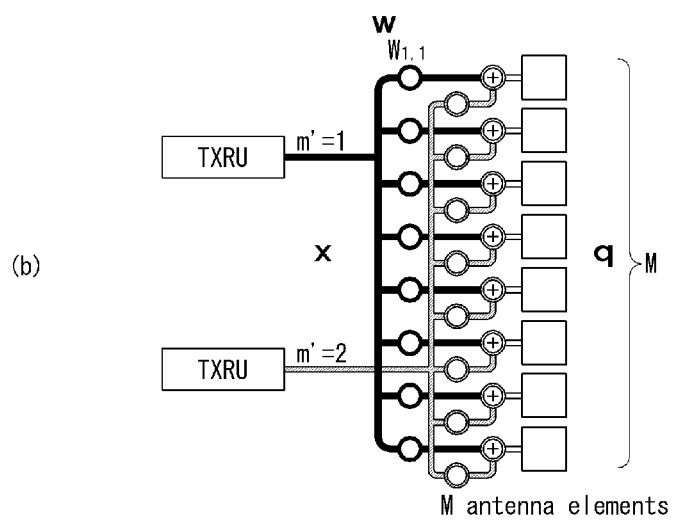

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which may be implemented in a variety of hardware forms.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 6:
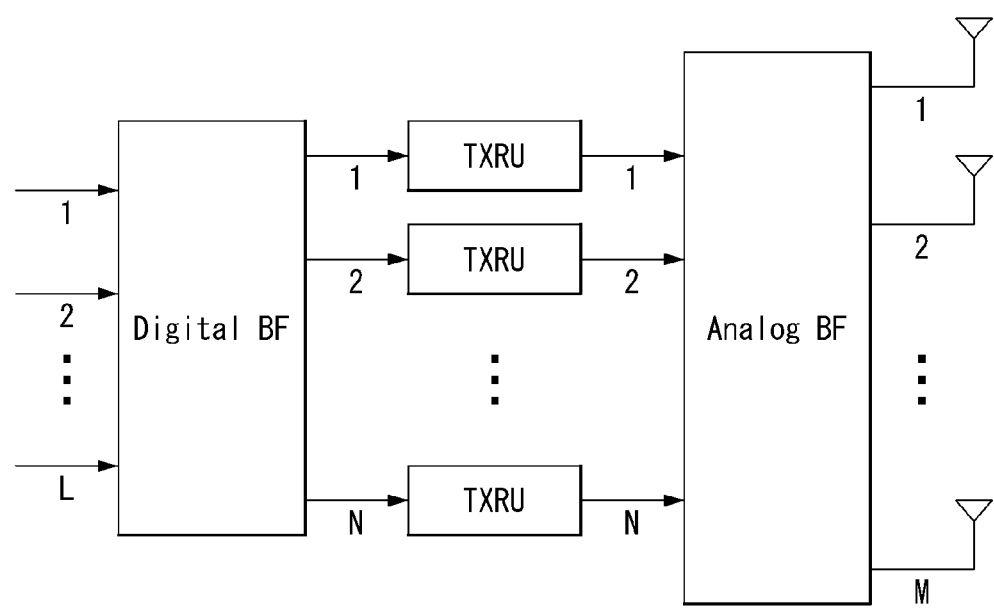
FIG. 6 is a diagram illustrating a hybrid beamforming structure in terms of TXRU and a physical antenna in the wireless communication system to which the method proposed in the present disclosure may be applied.

FIG. 6 is a diagram illustrating a hybrid beamforming structure in terms of TXRU and a physical antenna in the wireless communication system to which the method proposed in the present disclosure may be applied.

In FIG. 6, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 6, when N specific TXRUs and M specific RF antennas are defined as one antenna panel, a scheme that introduces a plurality of antenna panels capable of independent hybrid beamforming is also considered in the New RAT system.

Feedback of Channel State Information (CSI)

In a 3GPP LTE/LTE-A system, user equipment (UE) is defined to report channel state information (CSI) to a base station (BS or eNB).

The CSI collectively refers to information that may indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission may be simultaneously performed to multiple UEs in several analog beam directions.

Figure 7:
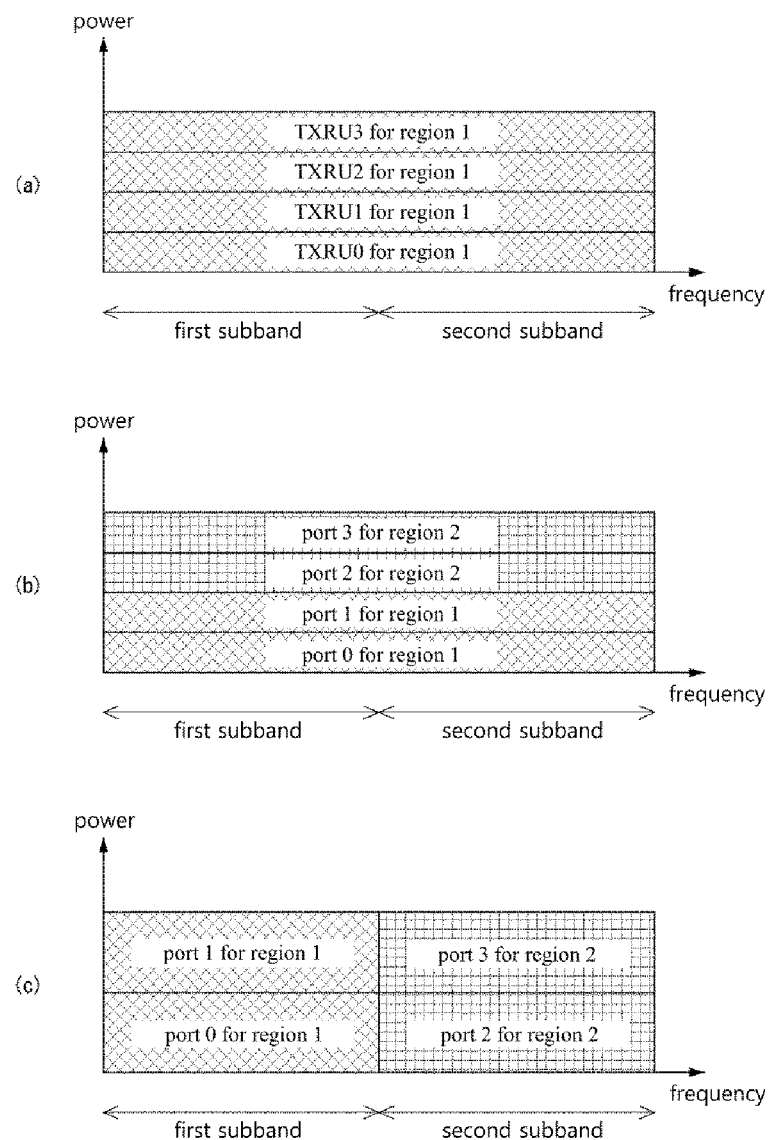
FIG. 7 is a diagram illustrating a service area for each transceiver unit in a wireless communication system to which the method proposed in the present disclosure may be applied.

FIG. 7 is a diagram illustrating a service area for each transceiver unit in a wireless communication system to which the present disclosure may be applied.

FIG. 7 illustrates a structure in which four sub-arrays are formed by quadrisecting 256 antenna elements, and each TXRU is connected to the sub-arrays as shown in FIG. 5 as an example.

When each sub-array is configured with a total of 64 (8×8) antenna elements in a two-dimensional array form, a region corresponding to a horizontal angle of 15 degrees and a vertical angle of 15 degrees may be covered by specific analog beamforming. That is, a region that a base station (BS) should serve is divided into a plurality of regions, and the divided regions are served one by one at a time.

In the following description, it is assumed that a CSI-RS antenna port and a TXRU are mapped in a one-to-one manner. Therefore, antenna port and TXRU have the same meaning in the following description.

If all TXRUs (antenna ports, sub-arrays) (i.e., TXRUs 0, 1, 2, and 3) have the same analog beamforming direction (i.e., region 1) as shown in FIG. 7(*a*), a digital beam having higher resolution may be formed to increase throughput of the corresponding region. In addition, the throughput of the corresponding region may be increased by increasing a rank of data transmitted to the region.

When the respective TXRUs (antenna ports, sub-arrays) (i.e., ports 0, 1, 2, and 3) have different analog beamforming directions (i.e., region 1 or region 2) as shown in FIGS. 7(*b*) and 7(*c*), data may be simultaneously transmitted in a corresponding subframe (SF) to UEs distributed in a wider region.

As in the example of FIGS. 7(*b*) and 7(*c*), two of the four antenna ports may be used for PDSCH transmission to UE1 in region 1 and the other two antenna ports may be used for PDSCH transmissions to UE2 in region 2.

In particular, FIG. 7(*b*) shows an example in which spatial division multiplexing (SDM) is performed on PDSCH1 transmitted to UE1 and PDSCH2 transmitted to UE2. Meanwhile, FIG. 7C shows an example in which PDSCH1 transmitted to UE1 and PDSCH2 transmitted to UE2 may frequency-division-multiplexed (FDM) and transmitted.

A preferred method may be changed according to a rank and modulation and coding scheme (MCS) served for a UE to maximize cell throughput among a method of serving a region using all antenna ports and a method of serving multiple regions simultaneously by dividing the antenna ports. In addition, the preferred method may be changed according to the amount of data to be transmitted to each UE.

The BS calculates a cell throughput or scheduling metric that may be obtained when serving a region using all antenna ports and calculates a cell throughput or a scheduling metric that may be obtained when serving two regions by dividing the antenna ports. The BS may select the final transmission method by comparing the cell throughputs or scheduling metrics that may be obtained through each method. As a result, the number of antenna ports participating in PDSCH transmission may vary in subframe units (SF-by-SF). In order for the BS to calculate the transmission MCS of the PDSCH according to the number of antenna ports and reflect it in a scheduling algorithm, an appropriate CSI feedback from a UE suitable is required.

Figure 8:
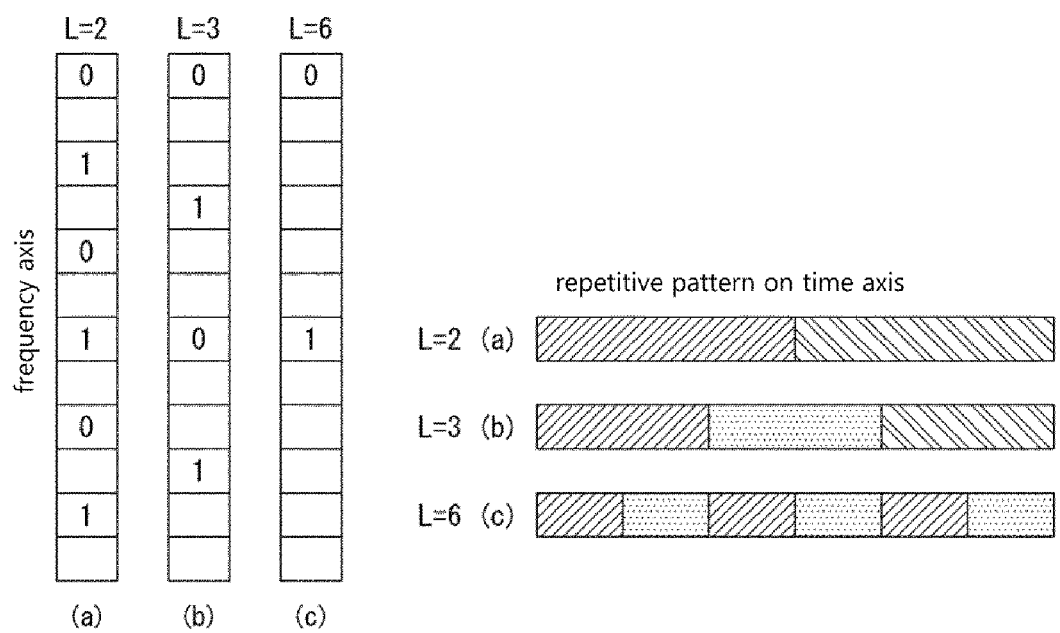
FIG. 8 is a diagram illustrating IFDMA to which the method proposed in the present disclosure may be applied.

FIG. 8 is a diagram illustrating IFDMA to which the method proposed in the present disclosure may be applied.

FIG. 8 shows an example of an IFDMA technique that may generate several sub-time units in one time unit (hereinafter, one OFDM symbol).

IFDMA is an abbreviation of interleaved frequency division multiple access. IFDMA is a method of transmitting information using only frequency resources (hereinafter, subcarriers) spaced apart from each other at a regular interval on a frequency axis, and in this method, a signal is repeated at a predetermined period.

For example, when a size of discrete Fourier transform (DFT) is 12 and intervals of the subcarriers are 2, 3, and 6, respectively, as shown in FIG. 8, a pattern in which signal is repeatedly transmitted according to the intervals of the subcarriers on a time axis appears.

In other words, (a) when the interval of subcarriers is 2 on the frequency axis, the signal is repeatedly transmitted twice on the time axis, (b) when the interval of the subcarriers is 3, the signal is repeatedly transmitted three times on the time axis, and (c) when the interval of the subcarriers is 6, the signal is repeatedly transmitted six times on the time axis.

In FIG. 8, "1" and "0" refer to different CSI-RS antenna ports.

Based on this method, the present disclosure proposes a method for selecting one or more reception beams from among a plurality of reception beams.

Hereinafter, the NR CSI-RS will be briefly described.

Since CSI-RS supports beam management for NR, CSI-RS design must consider analog beamforming aspects.

CSI-RS design requirements for beam management may differ from CSI-RS for CSI acquisition in terms of number of ports, time/frequency density, and port multiplexing methods.

Accordingly, there is a need to optimize the CSI-RS design for beam management and CSI acquisition while maintaining commonality between two CSI-RS types, such as CSI-RS RE locations.

A main purpose of CSI-RS for CSI acquisition is DL link adaptation similar to that of LTE CSI-RS, and a main purpose of other types of CSI-RS is DL Tx/Rx beam management not requiring measurement accuracy for link adaptation.

Thus, the CSI-RS for beam management may be sparser when compared with the CSI-RS for CSI acquisition in terms of frequency density.

However, CSI-RS for beam management may need to support transmission of more RSs in a slot to allow measurement of a large set of {Tx beam, Rx beam} premise.

In view of a unified CSI-RS design that considers both purposes, both CSI-RS types may be included in a CSI-RS resource configuration, and separate reporting configurations may be individually connected for CSI reporting and beam reporting.

[Proposal 1]: NR should consider independent optimization of two types of NZP CSI-RS.

CSI-RS type A: mainly for DL CSI acquisition
CSI-RS type B: mainly for DL beam management
CSI-RS for Beam Management Beam selection may be performed based on a comparison of reception powers (e.g., RSRP, etc.) of different CSI-RSs.

In order to minimize RS overhead, a single measurement wise comparison may be required. That is, each beam may correspond to one CSI-RS port. In an X-pol antenna, signals may be transmitted in only one poll or in two polls but may be virtualized to one port.

Accordingly, in the present disclosure, it is assumed that each beam corresponds to one CSI-RS port in order to minimize RS overhead.

In the case of CSI-RS Type B, the sub-time unit may be set to be equal to or smaller than one OFDM symbol in a reference numerology. Since the UE needs to be able to switch beams or measure beam quality at intervals of sub-time units, hardware performance of the UE such as beam switching latency, AGC saturation time, processing time, etc. may be considered.

If a sub-time unit is configurable, a minimum value for the sub-time unit may be determined according to UE performance. For example, the sub-time unit may be fixed to one OFDM symbol in the case of a low-end UE.

For periodic CSI-RS-based UE group common beam management, two or more UEs may share CSR-RS resources to select their Tx and Rx beams. In the case of this type of CSR-RS, the sub-time unit may be set based on a UE having the lowest performance.

Thus, the shared and periodic CSI-RS may be considered to use a sub-time unit having one OFDM symbol length, and a UE specific aperiodic/semi-permanent CSI-RS may be considered to use a sub-time unit smaller than one OFDM symbol.

Figure 9:
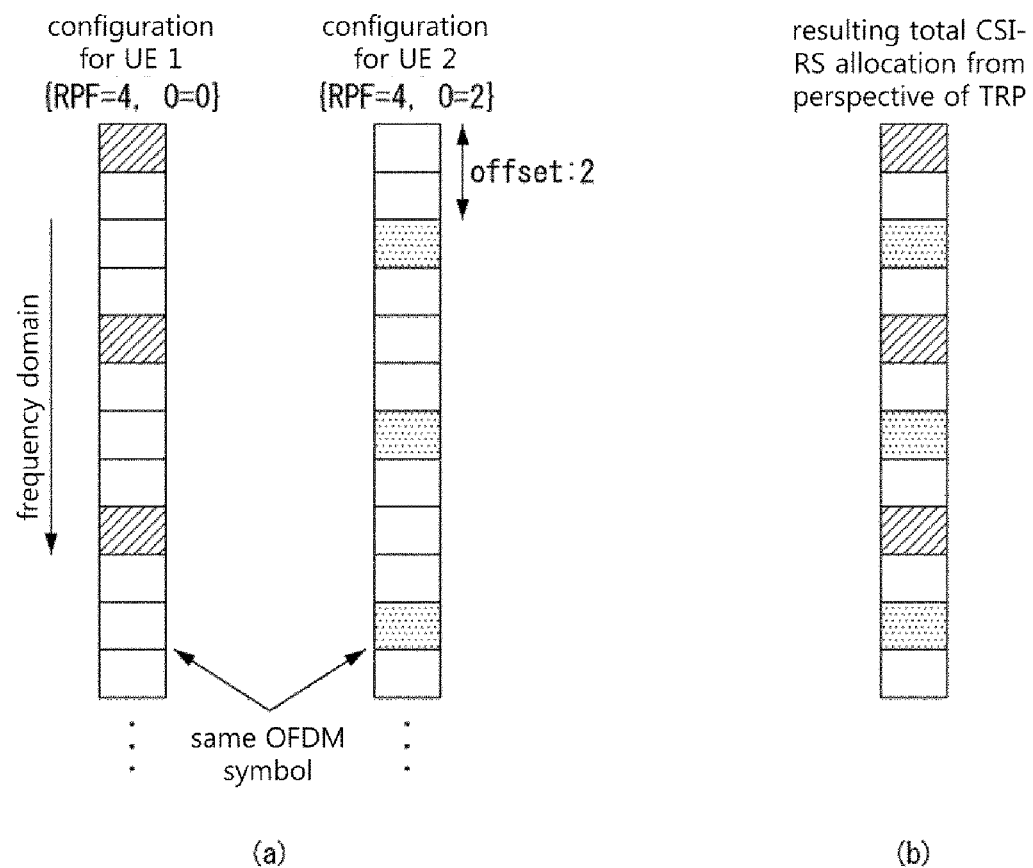
FIG. 9 is a diagram illustrating a configuration of a CSI-RS through IFDMA in a wireless communication system to which the method proposed in the present disclosure may be applied.

That is, a support range of the sub-time unit may vary according to performance of the UE as follows.

low-end UE: sub-time unit is equal to OFDM symbol
high-end UE: sub-time unit is set to a value smaller than the OFDM symbol FIG. 9 is a diagram illustrating a configuration of a CSI-RS through IFDMA in a wireless communication system to which the method proposed in the present disclosure may be applied.

Referring to FIG. 9, a CSI-RS may be transmitted through a sub-time unit smaller than one OFDM symbol using IFDMA.

Specifically, for a sub-time unit smaller than one symbol, one of three candidates may be down-selected up to RAN1 NR Ad-Hoc #2.

In order to reduce the sub-time unit, IFDMA may be more suitable than larger subcarrier spacing. Since a CSI-RS for lager subcarrier spacing may be performed with different sampling rates and FFT sizes, the UE needs an additional receiver filter to process CSI-RS symbols with different numerologies, which may increase complexity of the UE.

However, IFDMA may be implemented with a relatively simple comb-like CSI-RS structure. In the case of the larger subcarrier spacing, a guard subcarrier between different numerologies may be required, degrading transmission and reception efficiency as compared with IFDMA.

However, in the case of configuring a CSI-RS resource for transmitting the CSI-RS using IFDMA and transmitting the CSI-RS through the configured CSI-RS resource, the UE should recognize how to distinguish between NZP CSI-RS REs and ZP CSI-RS REs of the UE in the same OFDM symbol so as to be used for the number of repeated transmissions of CSI-RS, whether a comb offset is supported, and Rx beam sweeping for at least three and four antenna ports.

FIG. 9(a) shows a configuration of CSI-RS resources of each UE on the same OFDM symbol, and FIG. 9(b) shows a configuration of all CSI-RS resources allocated to UEs in terms of TRP.

In (a) of FIG. 9, since an interval of the subcarriers is 4, the CSI-RS resources allocated to UE 1 and UE 2 may be repeatedly transmitted four times at one OFDM symbol interval on a time axis.

Therefore, an indicator (first indicator or a repetition factor (RPF)) indicating the number of repeated transmissions of the CSI-RS for the UE 1 and the UE 2 is '4' and offset values (first offset values, comp offsets, or O) indicating first subcarriers to which the CSI-RS resources are mapped are '0' and '2', respectively.

That is, as shown in (a) of FIG. 9, when the comp offset is supported in the NR for the configuration of the CSI-RS resource having the IFDMA, UE 1 is configured with {RPF=4, O=0} and UE 2 is configured with {RPF=4, O=2}.

Here, UE 1 and UE 2 cannot know each other's configuration. In this case, since another FDM-ed CSI-RS resource allocated to UE 2 as {RPF=4, O=2} exists and the pattern in which the CSI-RS is repeated four times in the time domain is destroyed from a perspective of UE 1, the UE 1 cannot appropriately perform Rx beam sweeping with four different Rx beams although RPF is set to '4'.

Accordingly, the TRP must provide additional information such as the number of times the UE may perform Rx beam sweeping in the OFDM symbol. For example, although the RPF is set to '4' in FIG. 9, the BS should provide the UE with information indicating that up to two Rx beam sweeping can be performed.

That is, the BS transmits configuration information of the CSI-RS resources to the UE so that the UE may perform beam configuration.

In this case, the configuration information may include RPF, comb offset, and number information indicating a maximum number of times the UE may perform beam sweeping (that is, the maximum number of times of time domain repetitions in an OFDM symbol considering user multiplexing in the frequency domain).

In addition, for more flexible mapping of CSI-RS resources, the configuration information may further include a second indicator indicating a location where a non-zero power (NZP) CSI-RS resource is mapped and a third indicator indicating a location where the ZP CSI-RS resource is mapped.

In this case, the second indicator may include {NZP, RPF, O}, and the third indicator may include {ZP, RPF, O}.

In addition, when UE 1 supports an interference cancellation function, that is, when UE 1 is available for receiver processing for interference cancellation, the configuration information transmitted to UE 1 may include additional NZP CSI-RS resources.

For example, when UE 1 supports interference cancellation, the configuration information may include configuration information of the CSI-RS resource of UE 2. In this case, the UE 1 may perform beam configuration by receiving the CSI-RS by removing the configuration information of the CSI-RS resource of the UE 2 from the received configuration information.

In addition, the configuration information may include a cell (or TRP)-specific (or UE group specific-) RPF and/or comb offset value. That is, the configuration information may include an RPF (second indicator) and/or comb offset value (second offset value) set in a specific cell or a specific UE group.

For example, as a method of setting an RPF and/or comb offset value set in a specific cell or a specific UE group, the BS may include an RPF and/or comb offset value set in a specific cell or a specific UE group in a broadcasting control message (e.g., a mandatory information block (MIB) and/or a system information block (SIB)) of the corresponding cell (or TRP) and transmit the same to a plurality of corresponding UEs.

Through this, an effect of randomizing inter-cell/inter-TRP interference may be obtained and a degradation of performance due to a collision of IFDMA patterns between inter-cell/inter-TRP/inter-UE groups may be reduced through cooperation between UEs.

The UE receives the configuration information indicating the configuration of the CSI-RS resource from the BS and repeatedly receives the CSI-RS based on the received configuration information.

The UE may configure or manage the reception beam through beam sweeping based on the CSI-RS repeatedly transmitted from the BS.

For example, the UE receives the CSI-RS repeatedly transmitted from the BS through different reception beam candidates and selects a specific beam based on a result of receiving the CSI-RS through the reception beam candidates, thereby configuring and managing the beam.

CSI-RS Resource/Antenna Port to Beam Mapping

In LTE, CSI-RS resources may be mapped to beams for TRP for CoMP or Class B(e) FD-MIMO operation. The selection of the TRP or beam may be performed based on the CSI-RS resource wise measurement.

Similarly, in NR, TRB beam selection may be performed based on CSI-RS resource wise measurement. The CSI-RS resource for beam management may be mapped to a beam or beam group, and the UE may report the CRI to the BS for a beam or beam group selection.

Since there may be a large number of available beams, the case of beam group selection may be more efficient, and in this case, final beam selection may be performed through antenna port selection.

That is, a plurality of beam candidates may be grouped and mapped to a plurality of CSI-RS resources. In this case, beams belonging to the same CSI-RS resource may be identified as CSI-RS ports.

Accordingly, beam management may be efficiently performed through hierarchical beam grouping based on CSI-RS resources and CSI-RS ports.

CSI-RS Port Multiplexing within CSI-RS Resource

The CSI-RS port of the CSI-RS resource may be multiplexed through TDM or FDM or multiplexed through TDM and FDM. When TDM and FDM are compared, FDM may be more desirable for fast beam group selection.

In a case where a plurality of CSI-RS ports are FDM-ed in an OFDM symbol, multi-beam measurement may be performed in the OFDM symbol. In this case, beam group selection may be performed in the time domain, and beam selection within the beam group may be performed in the frequency domain.

The beam multiplexed in the frequency domain may be an analog beam transmitted simultaneously in different TXRUs or panels as well as a digital beam.

With regard to CSM-based port multiplexing, the TSI-CDM should be pursued because the CSI-RS for beam management requires an analog beam change in units of at least OFDM symbols. In a case where the FD-CDM is applied in cooperation with the FDM through the CSI-RS port, a better tolerance in frequency selectivity should be considered, while maintaining repeated transmissions of signals in the time domain, in rearrangement of the CSI-RS RE mapping per UE such that the location of the FD-CDM-ed RE is as close as possible.

Collision Handling Among CSI-RS Resources

In consideration of hybrid beamforming, activation of analog beam management and CSI acquisition for digital beamforming must be supported simultaneously. To this end, a plurality of CSI-RS resources for CSI acquisition and beam management may be configured as a UE, and each configured CSI-RS resource may be aperiodic, semi-permanent or periodic type.

In terms of gNB implementation, it may be difficult to always guarantee non-overlapping resource allocation for all configured CSI-RS resources.

In particular, in the case of non-periodic type CSI-RS resources, the network may intentionally trigger it in a slot in which a collision may occur with other configured CSI-RS resources in terms of flexible allocation of CSI-RS transmission for other uses.

Figure 10:
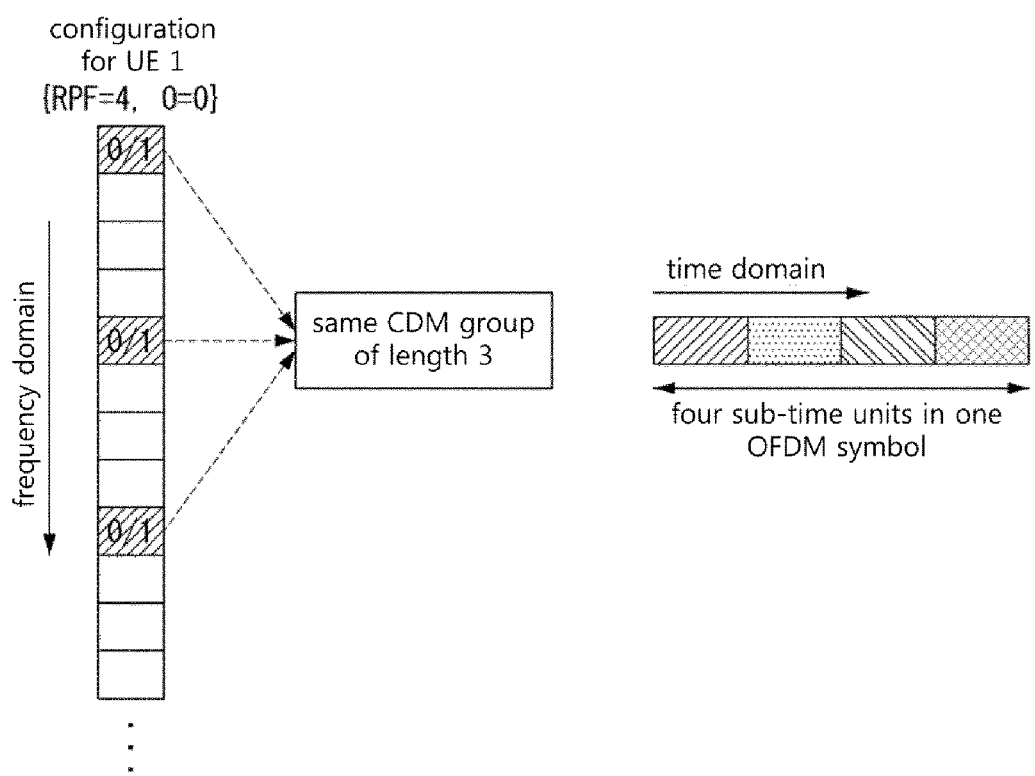
FIG. 10 is a diagram illustrating an example of a method of code-division-multiplexing (CDM) different CSI-RS ports in IFDMA proposed in the present disclosure.

In terms of UE implementation, a minimum specific collision handling rule for determining priority between aperiodic/semi-permanent/periodic CSI-RS resources need to be specified by including the case of CSI acquisition and beam management in order to avoid a collision in CSI-RS measurement and any potential ambiguity due to network flexibility in CSI-RS allocation FIG. 10 is a diagram illustrating an example of a method of code-division-multiplexing (CDM) different CSI-RS ports in IFDMA proposed in the present disclosure.

Referring to FIG. 10, in the case of transmitting CSI-RSs through a plurality of antenna ports, respectively, the CSI-RSs may be transmitted by multiplexing the plurality of antenna ports through CDM.

Specifically, in the case of transmitting a dedicated transmission beam to each UE by applying one port to each UE in CSI-RS transmission using IFDMA, the UE may recognize a pattern in which the CSI-RS is repeated different from the RPF value.

For example, as shown in FIG. 9, in a case where CSI-RS resources are configured as {RPF=4, O=0} and {RPF=4, O=2} at the two antenna ports, respectively, and the CSI-RSs are transmitted to each UE, each UE recognizes that the signal is repeated twice rather than four times on the time axis.

Therefore, a problem arises in that the number of beam sweeping is limited to a maximum of two even if the UE may be able to make three or more reception beams.

In order to solve the problem, when an orthogonal cover code (OCC) scheme such as a CDM as shown in FIG. 10 is applied, each UE may test up to four reception beams to perform beam management by sharing frequency resources.

FIG. 10 illustrates two antenna ports as a reference but may also be applied to a larger number of antenna ports.

In addition, the method illustrated in FIG. 10 may also be applied to a method of applying two ports to one UE and identifying signals transmitted through each port, rather than a user multiplexing point of view.

The BS may selectively use a FDM scheme, a CDM scheme, or a combination of FDM and CDM as a CDM-RS resource transmission method and may inform the UE of the FDM, the CDM, or the method of combining FDM and CDM through RRC signaling configuration.

Figure 11:
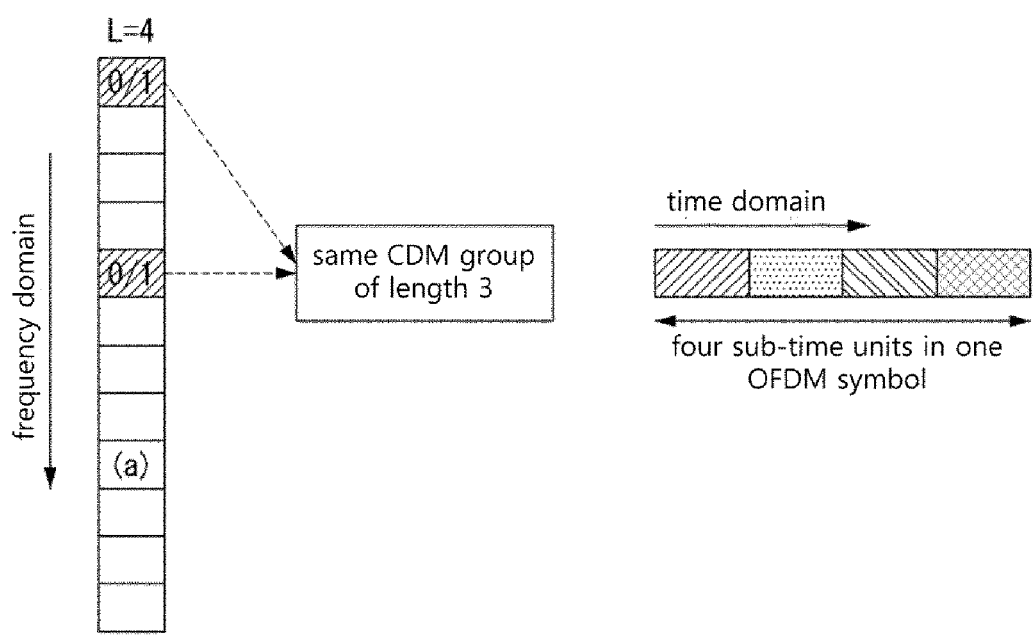
FIG. 11 is a diagram illustrating another example of a method of code-division-multiplexing (CDM) different CSI-RS ports in IFDMA proposed in the present disclosure.

FIG. 11 is a diagram illustrating another example of a method of code-division-multiplexing (CDMA) different CSI-RS ports in IFDMA proposed in the present disclosure.

Referring to FIG. 11, when configuring CSI-RS resources using IFDMA, the BS may configure an RE, which is to be configured as an NZP CSI-RS resource, as a ZP CSI-RS resource and repeatedly transmit the CSI-RS on the time axis.

Specifically, even when the RE indicated by (a) in FIG. 11 is mapped to the ZP CSI-RS RE, the UE may receive the CSI-RS repeatedly transmitted four times in one OFDM symbol interval on the time axis.

That is, no matter which signal is transmitted using an RE resource mapped at a regular interval on the frequency axis to transmit and receive the CSI-RS, the UE may receive the CSI-RS repeatedly transmitted a predetermined number of times at the OFDM symbol interval.

The BS may map some of the subcarriers, to which the NZP CSI-RS resources are mapped, to ZP CSI-RS resources at a regular interval in order to repeatedly transmit the CSI-RS using IFDMA on one OFDM symbol.

For example, the RE indicated by (a) in FIG. 11 should be mapped to the NZP CSI-RS resource in order to use IFDMA. However, (a) is mapped to the ZP CSI-RS resource, and thus, even if the BS transmits a null signal ('0' signal), CSI-RS may be repeatedly transmitted four times on the time axis because two NZP CSI-RS resources mapped at three null RE intervals are configured.

Although the time axis signal is not the same as transmitting the NZP CSI-RS in (a), a mechanism using a pattern in which the time axis signal is repeated to perform the reception beams sweeping operation may be similarly applied.

That is, even if the null signal is transmitted in (a), the UE may recognize that the same signal is repeatedly transmitted four times within one OFDM symbol period and may configure a beam by performing a beam sweeping operation.

This method may be applied based on 12 subcarriers in which CSI-RS is transmitted 2, 3, or 4 times, and the same or similar principle may be applied to other frequency resource grids with different frequency granularity, or may be modified or extendedly applied.

Here, the BS may further include, in the configuration information of the CSI-RS resource, a parameter value indicating a ratio of resources changed into the ZP CSI-RS resource among NZP CSI-RS resource to the NZP CSI-RS resources in 12 subcarriers of a single OFDM, and transmit the same to the UE.

That is, in FIG. 11, the BS may transmit, to the UE, the configuration information further including the parameter value (hereinafter, referred to as a "clipping factor") indicating a ratio of the resources changed into ZP CSI-RS resources among three NZP CSI-RSs.

Table 4 below shows an example of values of the clipping factor according to the RPFs.

TABLE 4

| Repetition factor (L) | Clipping factor | Offset |
| --- | --- | --- |
| 2 | 1, 1/2, 1/3 | 0, 1 |
| 3 | 1, 1/2 | 0, 1, 2 |
| 4 | 1, 1/3 | 0, 1, 2, 3 |

Figure 12:
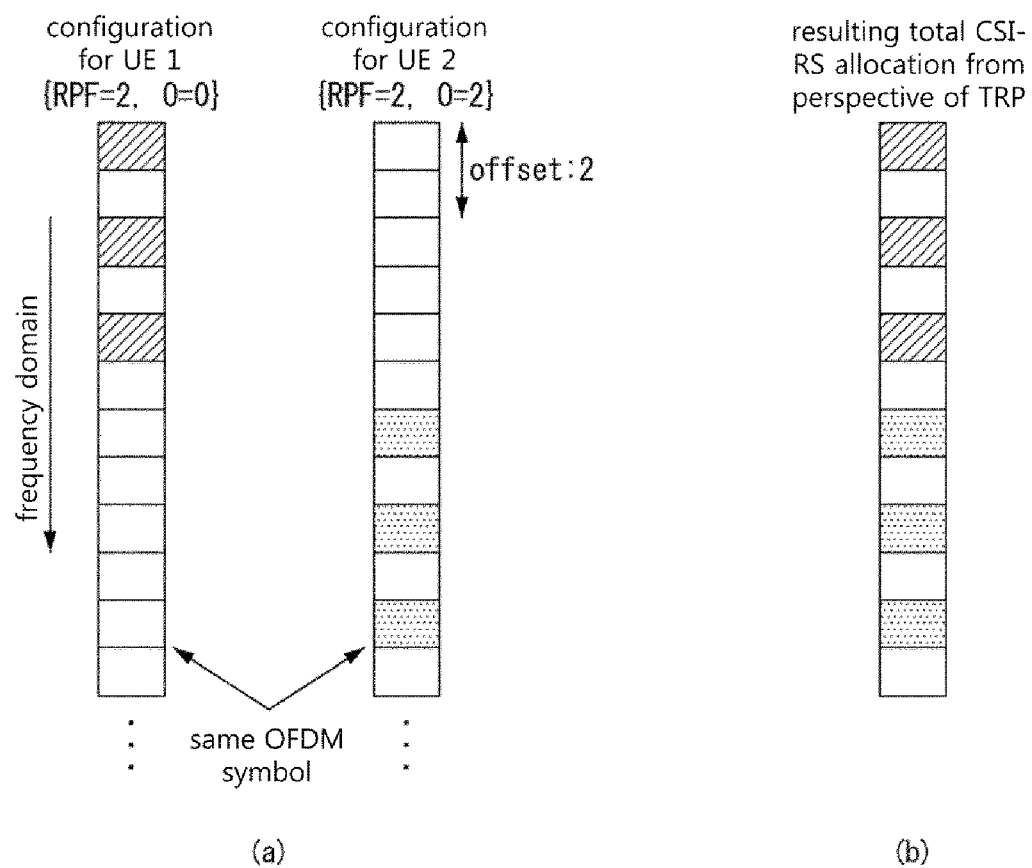
FIG. 12 is a diagram illustrating an example of a resource configuration for transmitting CSI-RSs of different UEs in the same orthogonal frequency device multiplexing (OFDM) symbol proposed in the present disclosure.

FIG. 12 is a diagram illustrating an example of a resource configuration for transmitting CSI-RSs of different UEs in the same orthogonal frequency division multiplexing (OFDM) symbol proposed in the present disclosure.

Referring to FIG. 12, when the BS configures CSI-RS resources of different antenna ports using IFDMA through the method described above with reference to FIG. 11, the BS may configure the RE, which is to be configured as a NZP CSI-RS resource, as a ZP CSI-RS resource and repeatedly transmit the CSI-RS on the time axis.

Specifically, when the UE multiplexing method is modified on the frequency axis based on the feature of transmitting the null signal described above with reference to FIG. 11, the REs allocated for UE 1 in (a) of FIG. 12 may be allocated such that one ZP CSI-RS resource which is an RE in which a null signal is transmitted is allocated between the NZP CSI-RS resources from the top RE to the sixth RE.

Through this, when the CSI-RS resource is configured using IFDMA, another signal may be transmitted through the resource in which a null signal is transmitted.

Figure 13:
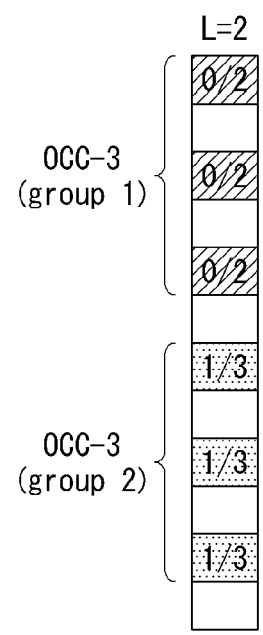
FIGS. 13 and 14 illustrate another example of a resource configuration for transmitting CSI-RSs of different UEs in the same OFDM symbol proposed in the present disclosure.
Figure 13:
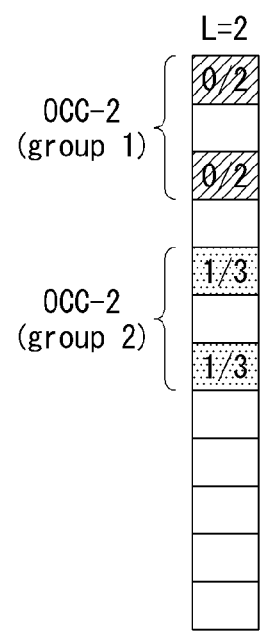
Figure 14:
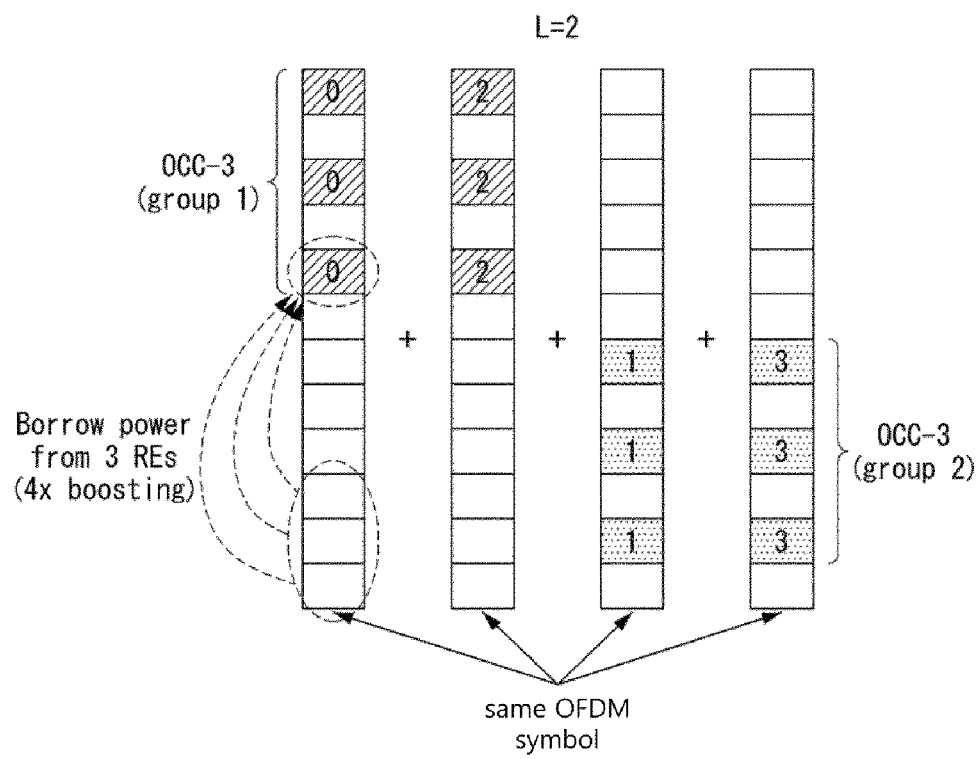

FIGS. 13 and 14 illustrate another example of a resource configuration for transmitting CSI-RSs of different UEs in the same OFDM symbol proposed in the present disclosure.

Referring to FIGS. 13 and 14, two or more CSI-RS ports may be multiplexed through the CDM method and the null signal transmission method described above with reference to FIGS. 11 and 12.

Specifically, in the case of four ports as illustrated in (a) and (b) of FIG. 13, two ports may be additionally multiplexed using the CDM scheme in the IFDMA pattern described above with reference to FIG. 12.

That is, as illustrated in (a) and (b) of FIG. 13, ports 0 and 2 and ports 1 and 3 may be multiplexed through CDM, and ports 0, 1, 2 and 3 may be multiplexed through the method described above with reference to FIG. 12.

In (a) of FIG. 13, the comb offset O for ports 0 and 2 is '0', and the comb offset O for ports 1 and 3 is '6'. In this case, two different antenna ports may be multiplexed by configuring CDM having a codeword length of 3.

With this method, up to six antenna ports may be multiplexed.

(b) of FIG. 13 shows an IFDMA pattern when a CDM having a codeword length of 2 is set.

In the case of (b) of FIG. 13, since the NZP CSI-RS RE allocated to each antenna port is one smaller than that of (a) of FIG. 13, (a) of FIG. 13 may be more efficient when 6 dB power boosting constraint is considered.

FIG. 14 shows CSI-RS resources allocated to each port in a single OFDM symbol for the pattern described above with reference to (a) of FIG. 13.

That is, FIG. 14 shows NZP CSI-RS resources and ZP CSI-RS resources allocated to each port in one OFDM symbol.

$P_{sum}=12\times P$(watt/OS/PRB/port): Total power available per antenna port in one OFDM symbol including 12 subcarriers P[RE/PRB/port]: Power consumption in single PDSCH RE 4P[RE/PRB/port]: Maximum power allocation in single CSI-RS RE (6 dB power boosting limit).

In FIG. 14, there are nine null REs that are not used for CSI-RS transmission for each port. Accordingly, power allocated to the NZP CSI-RS REs may be increased up to four times by allocating power, which is to be allocated to three Res, to one NZP CSI-RS.

However, in the case of (b) of FIG. 13, although there are 10 null REs, power that may be allocated to the NZP CSI-RS is up to four times, and thus, a total available power from a perspective of each antenna port is about 66.67% in (a) of FIG. 13.

That is, the CSI-RS resource mapping pattern shown in (a) of FIG. 13 is more efficient than that of (b) of FIG. 13 in terms of power utilization. However, the pattern shown in (a) of FIG. 13 is more sensitive to frequency selectivity than the pattern shown in (b) of FIG. 13.

Figure 15:
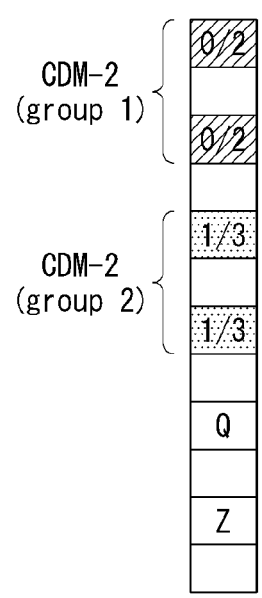
FIG. 15 is a diagram illustrating another example of a resource configuration for transmitting CSI-RSs of different UEs in the same OFDM symbol proposed in the present disclosure.

FIG. 15 is a diagram illustrating another example of a resource configuration for transmitting CSI-RSs of different UEs in the same OFDM symbol proposed in the present disclosure.

Referring to FIG. 15, in order to solve the characteristic sensitive to frequency selectivity described in (a) of FIG. 13, antenna ports may be mapped to null REs at a regular interval in (b) of FIG. 13.

Specifically, the pattern described in (a) of FIG. 13 has a feature of being sensitive to frequency selectivity.

Therefore, in order to solve this problem, the CSI-RS port may be multiplexed by combining the combination of CDM and FDM and the scheme of using only the FDM.

That is, for CSI-RS port multiplexing, as shown in FIG. 14, one of four antenna ports may be mapped to the locations of 'Q' and 'Z' in the mapping pattern of (b) of FIG. 13.

In the CSI-RS resource mapping method, if different antenna ports are mapped to the locations 'Q' and 'Z', a full power utilization gain may be obtained for the two mapped antenna ports.

Here, if the location of 'Q' is set to null in order to maintain the characteristics of IFDMA in which the same signal is repeatedly transmitted for a specific time interval on the time axis, the location of 'Z' must be set to null.

In other words, when the ZP CSI-RS resource is mapped to the location of 'Q', the ZP CSI-RS resource must also be mapped to the location of 'Z'.

Figure 16:
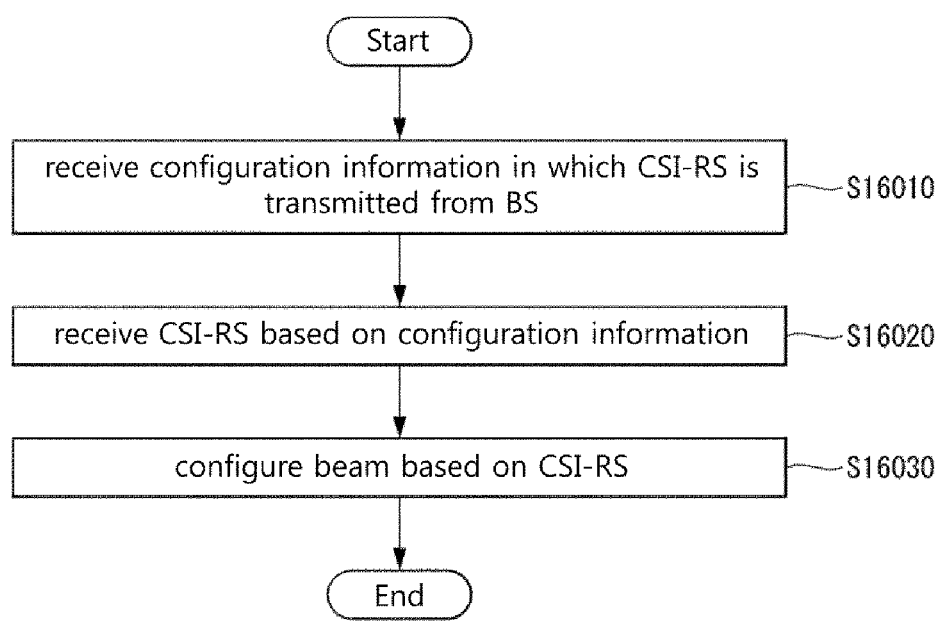
FIG. 16 is a diagram illustrating an example of a method for configuring a beam through a CSI-RS proposed in the present disclosure.

FIG. 16 is a diagram illustrating an example of a method for configuring a beam through a CSI-RS proposed in the present disclosure.

Referring to FIG. 16, a UE may configure a beam by performing beam sweeping based on CSI-RSs repeatedly transmitted from a BS.

Specifically, the UE may receive configuration information of CSI-RS resources in which CSI-RSs are transmitted from the BS (16010).

The CSR-RS resources may be mapped to subcarriers at a regular interval on a frequency axis through the method described above with reference to FIGS. 9 to 15.

The configuration information may be the same as the configuration information described above with reference to FIGS. 8 to 15. That is, the configuration information may include at least one of the first indicator indicating the number of times the CSI-RS is repeatedly transmitted, the first offset value of a first subcarrier to which the CSI-RS resource is mapped, number information indicating a maximum number of times the UE may perform beam sweeping, the second indicator indicating a location of a subcarrier to which the NZP CSI-RS resource is mapped, the third indicator indicating a location of a subcarrier to which the ZP CSI-RS resource is mapped, or the clipping factor.

In addition, when the UE supports the interference cancellation function, the configuration information may further include CSI-RS resource configuration information of another UE.

Thereafter, the UE receives the CSI-RSs from the BS based on the configuration information (S16020).

The CSI-RSs may be repeatedly transmitted to the UE within a specific time interval according to the first indicator included in the configuration information.

Thereafter, the UE may configure a beam based on the CSI-RSs (S16030).

That is, the UE may perform beam sweeping based on the repeatedly transmitted CSI-RSs and may perform beam management (or configuration) by selecting a specific beam through beam sweeping.

For example, repeatedly transmitted CSI-RSs are received through different reception beam candidates, and the UE may perform beam management (or configuration) by selecting a specific beam based on a result of receiving the CSI-RSs through the reception beam candidates.

General Device to which the Present is Applicable

Figure 17:
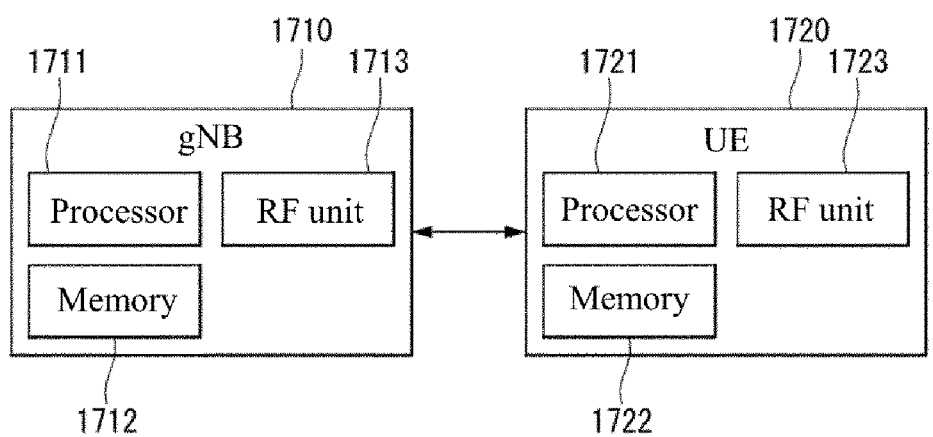
FIG. 17 illustrates a block diagram of a wireless communication device to which the methods proposed in this disclosure may be applied.

FIG. 17 illustrates a block diagram of a wireless communication device to which the methods proposed herein may be applied.

Referring to FIG. 17, a wireless communication system includes a base station (i.e., eNB) 1710 and multiple UEs 1720 located in an area of a BS 1710.

The BS and the UE may each be represented by a wireless device.

The BS 1710 includes a processor 1711, a memory 1712, and a radio frequency (RF) module 1713. The processor 1711 implements the functions, processes, and/or methods proposed in FIGS. 1 to 12. Layers of an air interface protocol may be implemented by the processor. The memory 1712 may be connected to the processor and stores various information for driving the processor. The RF module 1713 is connected with the processor to transmit and/or receive a radio signal.

The UE 1720 includes a processor 1721, a memory 1722, and an RF module 1723.

The processor 1721 implements the functions, processes, and/or methods proposed in FIGS. 1 to 12. Layers of an air interface protocol may be implemented by the processor. The memory 1722 is connected to the processor and stores various information for driving the processor. The RF module 1923 is connected to the processor to transmit and/or receive a radio signal.

The memories 1712 and 1722 may be present within or outside the processors 1711 and 1721 and may be connected to the processors 1711 and 1721 by various well-known means, respectively.

The BS 1710 and/or the UE 1720 may have a single antenna or multiple antennas.

Figure 18:
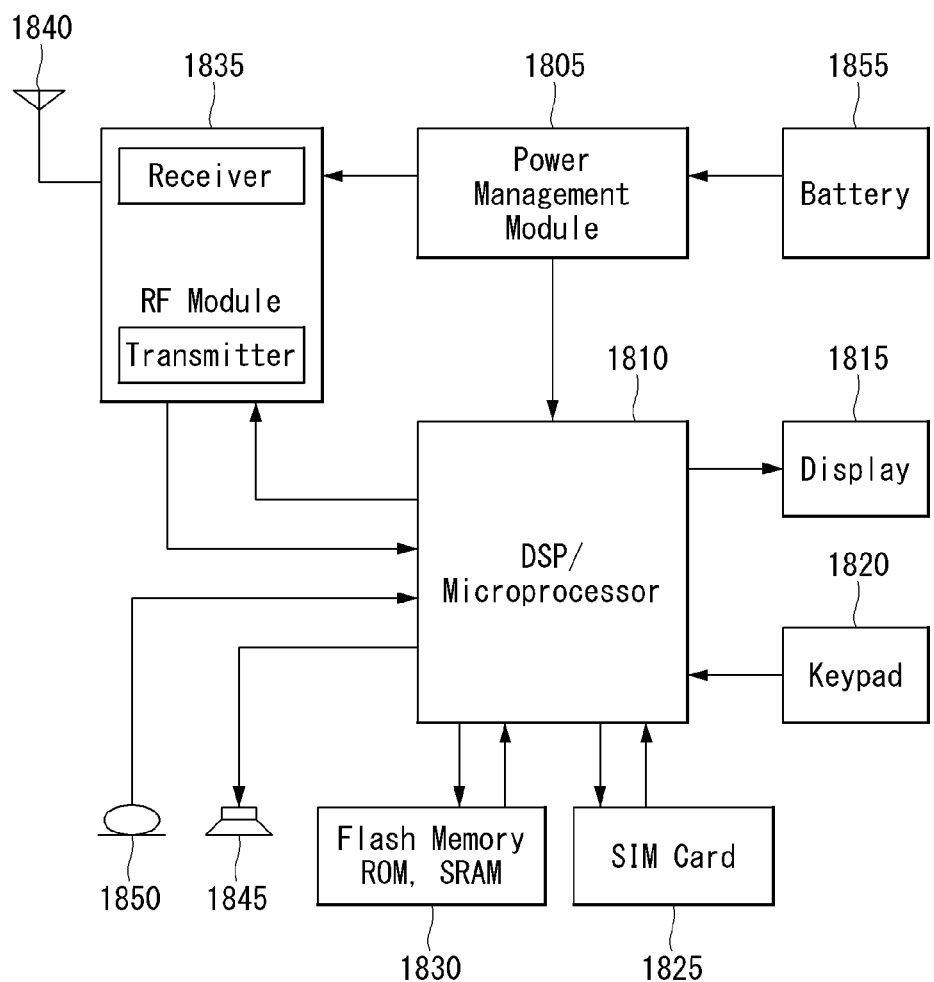
FIG. 18 illustrates a block diagram of a communication device according to an embodiment of the present disclosure.

FIG. 18 is a block diagram of a communication device according to an embodiment of the present disclosure.

In particular, FIG. 18 is a diagram specifically illustrating the UE of FIG. 17.

Referring to FIG. 18, the UE may include a processor (or a digital signal processor (DSP) 1810, an RF module (or RF unit) 1835, a power management module) 1805, an antenna 1840, a battery 1855, a display 1815, a keypad 1820, a memory 1830, a subscriber identification module) (SIM) card 1825 (optional), a speaker 1845, and a microphone 1850. The UE may also include a single antenna or multiple antennas.

The processor 1810 implements the functions, processes, and/or methods proposed in FIGS. 8 to 16. Layers of an air interface protocol may be implemented by the processor.

The memory 1830 is connected to the processor and stores information related to the operation of the processor. The memory 1830 may be within or outside the processor and may be connected to the processor by various well-known means.

The user inputs command information such as a telephone number, for example, by pressing (or touching) a button of the keypad 1820 or by voice activation using the microphone 1850. The processor receives such command information and processes to perform an appropriate function, such as dialing a phone number. Operational data may be extracted from the SIM card 1825 or the memory 1830. In addition, the processor may display command information or operation information on the display 1815 for user recognition and convenience.

The RF module 1835 is coupled to the processor to transmit and/or receive RF signals. The processor transfers command information to the RF module, for example, to transmit a radio signal configuring voice communication data to initiate communication. The RF module includes a receiver and a transmitter for receiving and transmitting radio signals. The antenna 1840 functions to transmit and receive radio signals. Upon receiving a radio signal, the RF module may transfer the signal and convert the signal to a baseband signal for the processor to process the same. The processed signal may be converted into audible or readable information output through the speaker 1845.

Figure 19:
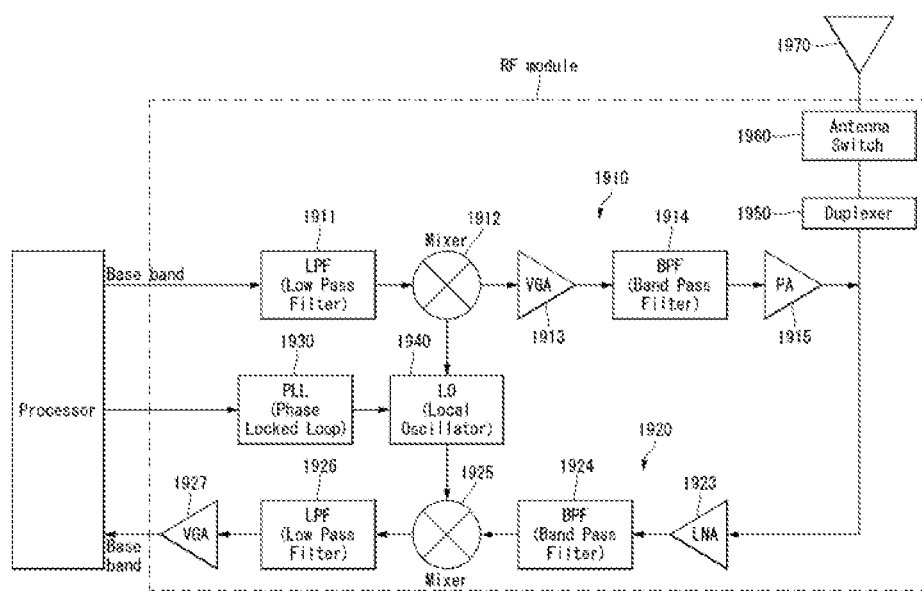
FIG. 19 is a diagram illustrating an example of a radio frequency (RF) module of a wireless communication device to which the method proposed in the present disclosure may be applied.

FIG. 19 is a diagram illustrating an example of an RF module of a wireless communication device to which the method proposed in present disclosure may be applied.

Specifically, FIG. 19 illustrates an example of an RF module that may be implemented in a frequency division duplex (FDD) system.

First, in a transmission path, the processor described above with reference to FIGS. 13 and 14 processes data to be transmitted and provides an analog output signal to a transmitter 1910.

In the transmitter 1910, the analog output signal is filtered by a low pass filter (LPF) 1911 to remove images caused by digital-to-analog conversion (ADC), upconverted from a baseband to RF by an up-converter (mixer) 1912, and amplified by a variable gain amplifier (VGA) 1913. The amplified signal is filtered by a filter 1914, additionally amplified by a power amplifier (PA) 1915, routed through duplexer(s) 1950/antenna switch(s) 1960, and transmitted via an antenna 1970.

In addition, in a reception path, the antenna 1970 receives signals from the outside and provides the received signals, and these signals are routed through the antenna switch(s) 1960/duplexers 1950 and provided to a receiver 1920.

In the receiver 1920, the received signals are amplified by a low noise amplifier (LNA) 1921, filtered by a bandpass filter 1924, and then down-converted from RF to a baseband by a down converter (mixer) 1925.

The down-converted signal is filtered by a low pass filter (LPF) 1926 and amplified by a VGA 1927 to obtain an analog input signal, which is provided to the processor described above with reference to FIGS. 12 and 13.

In addition, a local oscillator (LO) generator 1940 generates transmission and reception LO signals and provides the generated signals to the up-converter 1912 and down-converter 1925, respectively.

A phase locked loop (PLL) 1930 receives control information from the processor to generate transmission and reception LO signals at appropriate frequencies and provides control signals to the LO generator 1940.

Further, the circuits shown in FIG. 19 may be arranged to be different from the configuration shown in FIG. 19.

Figure 20:
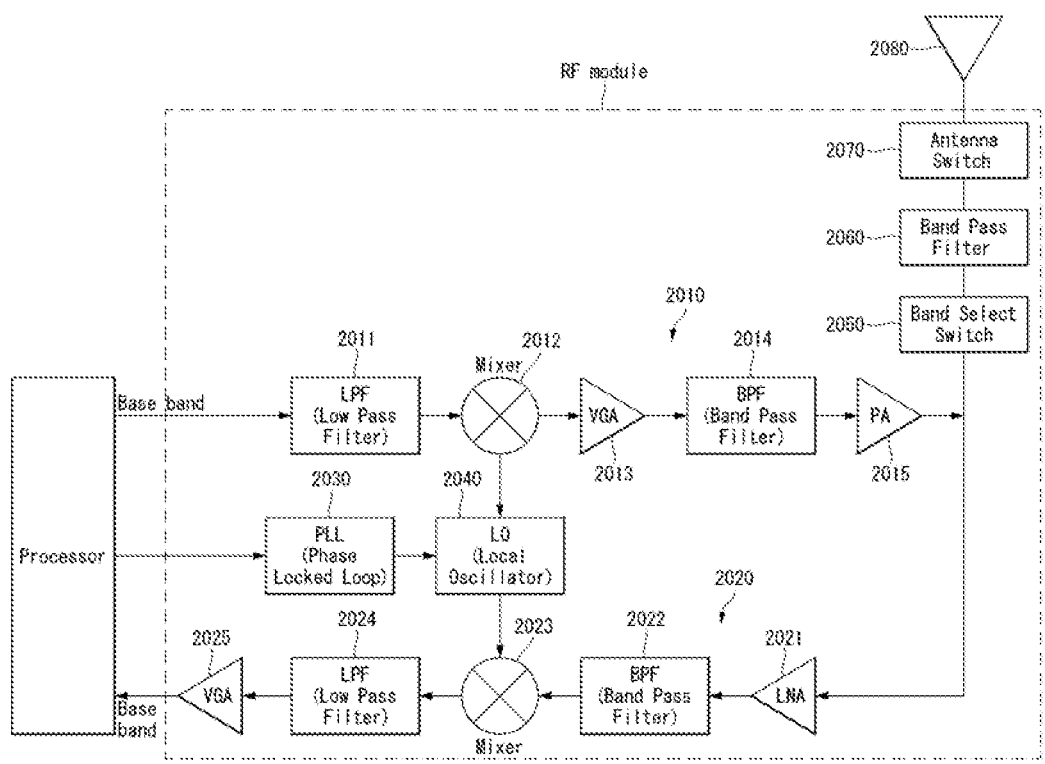
FIG. 20 is a diagram illustrating another example of an RF module of a wireless communication device to which the method proposed in the present disclosure may be applied.

FIG. 20 is a diagram illustrating another example of an RF module of a wireless communication device to which the method proposed in present disclosure may be applied.

Specifically, FIG. 20 illustrates an example of an RF module that may be implemented in a time division duplex (TDD) system.

A transmitter 2010 and a receiver 2020 of the RF module in the TDD system have the same structure as those of the transmitter and the receiver of the RF module in the FDD system.

Hereinafter, only a structure of the RF module of the TDD system different from the RF module of the FDD system will be described and the same structure thereof may be referred to the description of FIG. 19.

A signal amplified by the PA 2015 of the transmitter is routed through a band select switch 2050, a band pass filter (BPF) 2060, and an antenna switch(s) 2070 and transmitted through an antenna 2080.

Further, in a reception path, the antenna 2080 receives signals from the outside and provides the received signals, and these signals are routed through the antenna switch(s) 2070, the BPF 2060 and the band select switch 2050 and provided to the receiver 2020.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

Examples of the method of mapping a reference signal in the wireless communication system of this disclosure applied to a 3GPP LTE/LTE-A system and a 5G system (new RAT system) is described, but the method may also be applied to various other wireless communication systems.

The invention claimed is:

1. A method of receiving a reference signal by a user equipment (UE) in a wireless communication system, the method comprising:
    receiving configuration information of a channel state information (CSI)-reference signal (RS) resource in which a CSI-RS is transmitted from a base station (BS);
    receiving the CSI-RS based on the configuration information; and
    configuring a beam based on the CSI-RS,
    wherein the configuration information comprises at least one of a first indicator indicating a number of times the CSI-RS is repeatedly transmitted, a first offset value of a first subcarrier to which the CSI-RS resource is mapped, or number information indicating a maximum number of times the UE performs beam sweeping,
    wherein the CSI-RS resource is mapped to a subcarrier at a regular interval on a frequency axis,
    wherein the CSI-RS is repeatedly transmitted within a specific time interval according to the first indicator, and the specific time interval is one orthogonal frequency division multiple (OFDM) symbol interval,
    wherein the mapping of the CSI-RS is performed based on a specific RE pattern which is configured for 12 subcarriers within one OFDM symbol,
    wherein the specific RE pattern represents resource elements (REs) related to a plurality of CSI-RS port groups,
    wherein the REs related to the plurality of CSI-RS port groups includes i) first REs related to the each of the plurality of CSI-RS port groups, ii) a second RE and iii) a third RE,
    wherein one of the first REs is related to a plurality of CSI-RS ports, based on a code division multiplexing (CDM) and a frequency division multiplexing (FDM),
    wherein the second RE and the third RE are, based on the FDM, related to i) one of total CSI-RS ports based on the plurality of CSI-RS port groups or ii) a zero power (ZP) CSI-RS,
    wherein, based on the second RE being related to the one of total CSI-RS ports based on the plurality of CSI-RS port groups, a CSI-RS port related to the third RE is different from that of the second RE, and
    wherein, based on the second RE being related to the ZP CSI-RS, the third RE is related to the ZP CSI-RS.

2. The method of claim 1, wherein the configuration information comprises a second indicator indicating a location of a subcarrier to which a non-zero power (NZP) CSI-RS resource is mapped and a third indicator indicating a location of a subcarrier to which a zero power (ZP) CSI-RS resource is mapped.

3. The method of claim 2, wherein CSI-RS resources of other UEs are mapped to subcarriers after the last subcarrier to which the ZP CSI-RS resource is mapped at the same interval as the interval of the CSI-RS resources of the UE.

4. The method of claim 1, wherein when the UE supports an interference cancellation function, the configuration information further comprises CSI-RS resource configuration information of another UE.

5. The method of claim 1, wherein the configuration information further comprises a second indicator indicating the number of times of repeated transmission of a CRS-RS configured to be specific for a cell or a group.

6. The method of claim 1, wherein a null signal is transmitted on the last subcarrier to which the CSI-RS resource is mapped.

7. The method of claim 1, wherein a null signal is transmitted on at least one of the first subcarrier and the last subcarrier among a plurality of subcarriers to which the CSI-RS resources are mapped.

8. The method of claim 7, wherein the configuration information further comprises a parameter value indicating a ratio of the subcarrier to the plurality of subcarriers.

9. The method of claim 1, wherein the repeatedly transmitted CSI-RSs are received through different reception beam candidates.

10. The method of claim 9, wherein the configuring of a beam comprises selecting a specific beam based on a reception result of the CSI-RSs through the reception beam candidates.

11. The method of claim 1, wherein each of the plurality of CSI-RS port groups is distinguished based on the FDM.

12. A user equipment (UE) of receiving a reference signal in a wireless communication system, the UE comprising:
a radio frequency (RF) module including a transceiver configured to transmit and receive a radio signal; and
a processor configured to control the RF module,
wherein the processor is configured to
control the RF module to receive configuration information of a channel state information (CSI)-reference signal (RS) resource in which a CSI-RS is transmitted from a base station (BS),
control the RF module to receive the CSI-RS based on the configuration information, and
control the RF module to configure a beam based on the CSI-RS, wherein the configuration information includes at least one of a first indicator indicating a number of times the CSI-RS is repeatedly transmitted, a first offset value of a first subcarrier to which the CSI-RS resource is mapped, or number information indicating a maximum number of times the UE performs beam sweeping,
wherein the CSI-RS resource is mapped to a subcarrier at a regular interval on a frequency axis,
wherein the CSI-RS is repeatedly transmitted within a specific time interval according to the first indicator, and the specific time interval is one orthogonal frequency division multiple (OFDM) symbol interval,
wherein the mapping of the CSI-RS is performed based on a specific RE pattern which is configured for 12 subcarriers within one OFDM symbol,
wherein the specific RE pattern represents resource elements (REs) related to a plurality of CSI-RS port groups,
wherein the REs related to the plurality of CSI-RS port groups includes i) first REs related to the each of the plurality of CSI-RS port groups, ii) a second RE and iii) a third RE,
wherein one of the first REs is related to a plurality of CSI-RS ports, based on a code division multiplexing (CDM) and a frequency division multiplexing (FDM),
wherein the second RE and the third RE are, based on the FDM, related to i) one of total CSI-RS ports based on the plurality of CSI-RS port groups or ii) a zero power (ZP) CSI-RS,
wherein, based on the second RE being related to the one of total CSI-RS ports based on the plurality of CSI-RS port groups, a CSI-RS port related to the third RE is different from that of the second RE, and
wherein, based on the second RE being related to the ZP CSI-RS, the third RE is related to the ZP CSI-RS.

* * * * *